No. 890,539. PATENTED JUNE 9, 1908.
E. W. STULL.
FIELD COIL SUPPORT.
APPLICATION FILED MAR. 9, 1905.
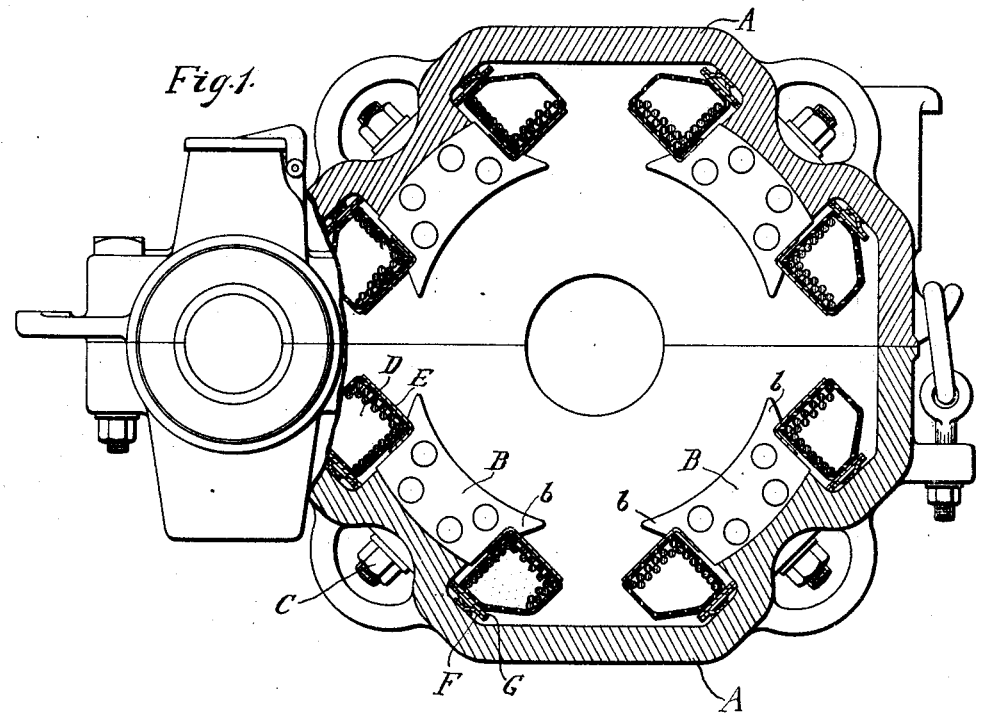
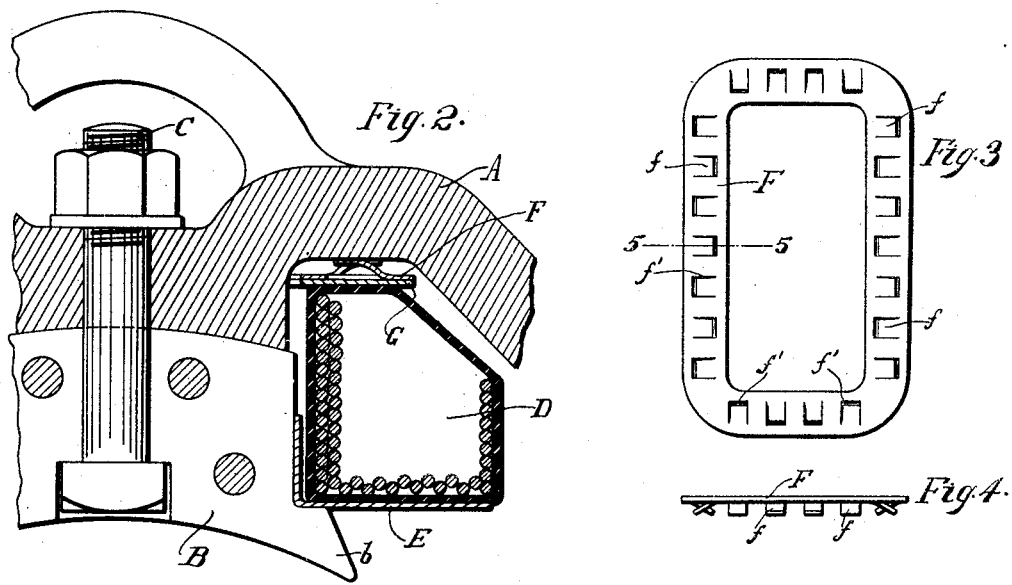
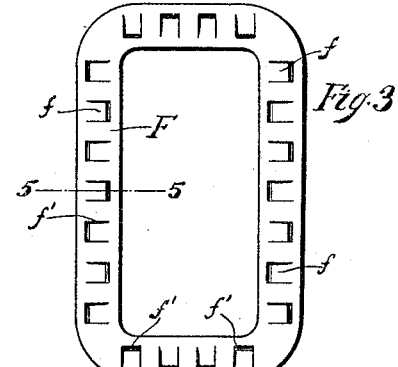
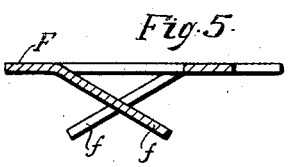
Witnesses:
George J. Schwartz
Fred J. Kinsey
Inventor:
Emmett W. Stull.
By
Chas. E. Lord
Attorney.

UNITED STATES PATENT OFFICE.

EMMETT W. STULL, OF NORWOOD, OHIO, ASSIGNOR TO THE BULLOCK ELECTRIC MANUFACTURING COMPANY, A CORPORATION OF OHIO.

FIELD-COIL SUPPORT.

No. 890,539.      Specification of Letters Patent.      Patented June 9, 1908.

Application filed March 9, 1905. Serial No. 249,193.

*To all whom it may concern:*

Be it known that I, EMMETT W. STULL, citizen of the United States, residing at Norwood, in the county of Hamilton and State of Ohio, have invented certain new and useful Improvements in Field-Coil Supports, of which the following is a full, clear, and exact specification.

My invention relates to improvements in dynamo electric machine construction and particularly to the means employed for holding the field coils of the machine firmly in place on the poles thereof.

In dynamo electric machines and especially in portable motors, it often happens that the machine is subject to vibration which has a detrimental effect upon the machine if the parts are not all firmly held in place. This is especially true with railway motors which are subject to severe vibration and great changes in temperature and climatic conditions. It therefore happens that under certain circumstances the field coils which fit closely upon the pole-pieces when the machine is first assembled become loose and move on the pole-pieces, the insulation of the coils is abraded and punctured and the coils become grounded or short-circuited.

The object of my invention is to avoid the difficulties above enumerated and to accomplish this object I employ a spring plate coil seat which holds the coil firmly in place on the pole-piece.

More specifically considered my invention consists of a dynamo electric machine frame, a field coil mounted in said frame, and a coil support consisting of a plate of spring metal having tabs punched therefrom and bent out of the plane of the plate, said plate being located between the coil and the frame.

In the accompanying drawings, which illustrate the preferred embodiment of my invention, Figure 1 is an elevation, partly in section, of the field frame of a railway motor equipped with my improved field coil support; Fig. 2 is a sectional view of part of the machine shown in Fig. 1 on a larger scale; Figs. 3 and 4 are plan and end views of the coil support removed from the pole; and Fig. 5 is a sectional view on line 5—5 of Fig. 3.

Referring now to the drawings, the frame of the dynamo electric machine is illustrated as the field frame A of a railway motor. The pole-pieces B are fastened to said frame in any suitable manner, such as by means of bolts C. The field coils D which surround said pole-pieces are held firmly in place thereon by means of the spring plate F which is preferably located between the frame and the coil. This plate F is preferably of spring steel or other resilient material. The plate has a central opening through which the pole-piece is passed and also has slits $f^1$, which permit portions of the metal of the plate to be bent out of the plane of the plate to form leaf springs or tabs $f$. These tabs are punched from the plate F all around the central opening in the manner shown in Figs. 3 to 5 inclusive, and the slits $f^1$ are preferably so arranged that some of the tabs may be bent in one direction and others in another direction. The best results are obtained when adjacent tabs are bent in opposite directions; that is, alternately right and left.

When the plate is in position on the pole-piece, the tabs preferably rest against the frame, (though if desired this position may be reversed) and maintain the face of the plate in substantially the same plane. The tabs act as leaf springs which hold the coil firmly in position on the pole, forcing said coil with considerable pressure against the plate E which rests against the pole tips $b$. This pressure by my improved construction is uniformly distributed around the pole-piece, thereby avoiding all tendency to distort the coil and preventing all damage from vibration and from changes in the size and shape of the coil due to the detrimental effects of temperature changes and climatic conditions. The spring plate also takes up any shrinkage of the coil due to the drying out of the insulation.

To avoid damage to the coil insulation by the punched plate F, I prefer to employ an imperforate plate G between the plate F and the coil. This plate G may be of metal or insulating material as desired.

I aim in the appended claims to cover all modifications of my invention which do not involve a departure from its spirit and scope.

Having thus described my invention, what I claim as new and desire to secure by Letters Patent is:—

1. In a dynamo-electric machine, a frame, a pole-piece therein, a coil mounted on said pole-piece, and a plate of spring metal having tabs punched therefrom and bent out of the plane of the plate alternately in opposite directions, said plate and tabs coöperating with the coil and frame to form a yielding support for the coil.

2. In a dynamo electric machine, a frame, a field coil mounted in said frame, and a coil support consisting of a plate of spring metal having tabs punched therefrom and bent out of the plane of the plate, said plate being located between the coil and frame, and an imperforate plate located between the coil and the coil support.

3. In a dynamo electric machine, a frame carrying a pole-piece, a coil surrounding said pole-piece, and a coil support also surrounding said pole-piece and located between the coil and frame, said support consisting of a plate of spring material having tabs punched therefrom and bent out of the plane of the plate so as to form a plurality of leaf springs which hold the coil firmly in place on the pole-piece.

4. A coil support consisting of a plate of spring metal having a central opening to receive a pole-piece, said plate having tabs punched therefrom, said tabs being bent out of the plane of said plate alternately in opposite directions.

In testimony whereof I affix my signature, in the presence of two witnesses.

EMMETT W. STULL.

Witnesses:
LAURENT LOWENBERG,
FRED J. KINSEY.